(12) United States Patent
Boger et al.

(10) Patent No.: US 7,398,127 B2
(45) Date of Patent: Jul. 8, 2008

(54) SYSTEMS AND METHODS FOR FACILITATING WIRELESS COMMUNICATION BETWEEN VARIOUS COMPONENTS OF A DISTRIBUTED SYSTEM

(75) Inventors: Michael Boger, Palo Alto, CA (US); Thomas Russell, Murray Hill, NJ (US); Larry Marini, Worthing (GB)

(73) Assignee: Edwards Vacuum, Inc., Wilmington, MA (US)

( * ) Notice: Subject to any disclaimer, the term of this patent is extended or adjusted under 35 U.S.C. 154(b) by 114 days.

(21) Appl. No.: 11/029,068

(22) Filed: Jan. 4, 2005

(65) Prior Publication Data
US 2006/0148481 A1    Jul. 6, 2006

(51) Int. Cl.
*G05B 19/18* (2006.01)
*G06F 15/16* (2006.01)

(52) U.S. Cl. .............................. 700/9; 700/65; 709/208
(58) Field of Classification Search ..................... 700/9, 700/65, 208; 455/3.03; 370/913; 709/208
See application file for complete search history.

(56) References Cited

U.S. PATENT DOCUMENTS

| | | | | |
|---|---|---|---|---|
| 5,873,043 A | * | 2/1999 | Comer | 455/458 |
| 6,385,497 B1 | * | 5/2002 | Ogushi et al. | 700/110 |
| 6,922,432 B2 | * | 7/2005 | Callaway et al. | 375/141 |
| 6,925,335 B2 | * | 8/2005 | May et al. | 700/9 |
| 6,957,112 B2 | * | 10/2005 | Ina et al. | 700/96 |
| 7,027,881 B2 | * | 4/2006 | Yumoto et al. | 700/65 |
| 7,062,221 B1 | * | 6/2006 | Christensen | 455/3.01 |
| 7,092,988 B1 | * | 8/2006 | Bogatin et al. | 709/203 |
| 2003/0012373 A1 | * | 1/2003 | Ogura et al. | 380/30 |

* cited by examiner

*Primary Examiner*—Thomas K Pham
(74) *Attorney, Agent, or Firm*—Mary K. Nicholes

(57) ABSTRACT

The present invention provides systems and methods for facilitating communications between various components of distributed system. Specifically, the systems and methods of the present invention provide a wireless network for linking the various components of manufacturing equipment or manufacturing systems to one or more central control devices. Each component of the manufacturing equipment and the central control devices include a wireless module for handling communications between the components and the control devices. In some embodiments, one or more of the components may act as a server for other components in the network. In some embodiments, multiple data channels are used for communication between the components and the central control devices.

20 Claims, 4 Drawing Sheets

SYSTEMS AND METHODS FOR FACILITATING WIRELESS COMMUNICATION BETWEEN VARIOUS COMPONENTS OF A DISTRIBUTED SYSTEM

BACKGROUND OF THE INVENTION

1. Field of the Invention

The present invention relates generally to a wireless network and more particularly to a wireless network for communicating information and commands between the various components of manufacturing equipment or manufacturing systems.

2. Description of Related Art

Many of today's manufacturing equipment includes a wide variety or sensors and actuators that respectively provide data concerning a manufacturing process and control various components used in the manufacturing process. Theses sensors and actuators are connected to local controllers that are in turn, connected to a central control system. In some instances, the sensors and actuators are connected directly to the central control system. Importantly, in most conventional manufacturing equipment, the various components communicate normally using a physical connection for communications, such as a twisted pair of wires, or other cabling. The use of communication cables is expensive in both design and in implementation.

The cable layout design typically involves specialized software to ensure that the physical layout of the cables is correct and that the ambient conditions are correct. Moreover, the cable needs to have the correct specification and shielding to ensure reliability, both physical and communicative. The cables themselves are also expensive, with a good portion of the cost residing in the connectors. The connectors are also problematic in terms of reliability both during maintenance and in normal operation.

For a semiconductor process tool, for example, there are many different devices to which a central controller is connected. A large number of physical ports are used to connect each of the components of the process tool. In addition, not all of the various devices have the same type of communication medium or protocol. All of these factors conspire to drive the cost of the system up and the reliability down, particularly since many of the communications are point-to-point serial.

BRIEF SUMMARY OF THE INVENTION

The present invention provides systems and methods for facilitating communications between various components of distributed system. Specifically, the systems and methods of the present invention provide a wireless network for linking the various components of manufacturing equipment or manufacturing systems. Each component of the manufacturing equipment may include a wireless node in the form of a wireless module that acts as a client. The wireless module can take the form of a PC card as used in many personal computers and laptops. In other embodiments, the wireless module may be embedded in the component.

Importantly, the wireless module includes a processor, a memory, encoder/decoder, transceiver, and an optional antenna depending on the mode of wireless communication. The processor of the wireless module handles communications to and from the transceiver and the encoder/decoder decodes signals received by the transceiver and encodes signal transmitted by the transceiver. The wireless module may use any protocol for transmission of data, such as IEEE802.11x wireless LAN, Bluetooth, ZigBee, WPAN (wireless personal area network), Wi-Fi, or UWB (ultra wide band) implementations. Further, if the wireless device uses an infrared transceiver, the protocol used for wireless transmission may be IrDA.

Further, the wireless module may use any data protocol for data communication. In one embodiment, the wireless module uses an Ethernet protocol, such as Transmission Control Protocol/Internet Protocol (TCP/IP), for communicating data and commands with other components in the network and the central control system. One central access point to the wireless node is typically used, but additional access points may be provided for better coverage and redundancy.

Importantly, the system of the present invention includes a central control system for communicating with each of the wireless modules on each of the components distributed about the manufacturing equipment or system. The central control module typically controls communication on the wireless network formed by the components. The central control module operates to receive and process information relayed from sensors, while also providing commands and other signals to the wireless devices to perform actions in the manufacturing process. For example, the central control module may wirelessly communicate with one component, such as an actuator, commanding the component to perform some process. The central control module may also wirelessly communicate with another component, such as a sensor, requesting that the component provide information about the process.

Although communications typically flow directly to the central control module, in some embodiments, the system may include local control modules that are connected to one or more components that act as an intermediate relay information from the components to and from the central control module. Typically, the individual wireless modules on each component operate as clients that interact with the central control module. However, in some embodiments, the wireless modules may operate as both clients and servers to other wireless modules on other components. This allows the wireless modules to pass data from one component to the next and ultimately back to the central control module. This method provides a redundant path for the flow of data since the components can route the data in many ways. Also, the amount of power required for transmission can be reduced since the component need only communicate with its nearest neighbors and not directly with the central control module.

The systems and methods of the present invention may also provide for communication on different channels. For example, the systems and methods may set up different communication channels for monitoring and control data, where the communications are performed at different frequency bandwidths. For example, IEEE802.11x networks operate on a number of channels, where each channel corresponds to a given frequency. The use of channels allows more than one network to operate in the same space without interference. Allocating the control function to one channel and the monitoring function to another channel could be used to make sure that the monitoring function does not impede the control function due to bandwidth limitations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
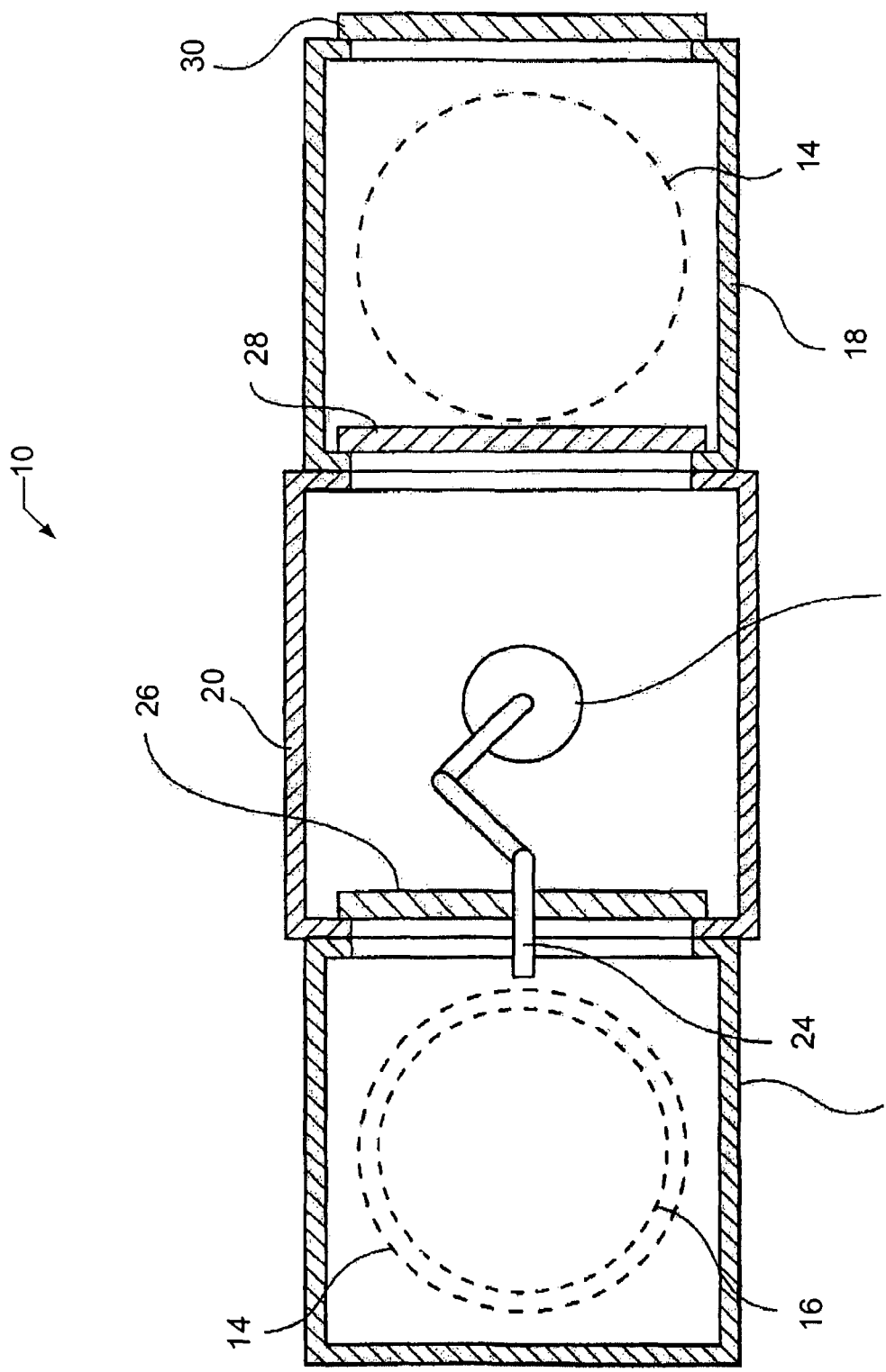
FIG. 1 is a diagrammatic view illustrating a construction of a semiconductor device manufacturing machine within which the systems and methods may be incorporated.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein. Like reference numerals are used to refer to like elements throughout the drawings.

As discussed above and provided in more detail below, the systems and methods of the present invention provide a wireless network for connecting the various components located on manufacturing equipment, and the like. It is contemplated that the systems and methods of the present invention may be incorporated into any machinery or equipment that comprises a plurality of distributed components, where communication with the various components is desired. In these embodiments, the cables usually connecting the various components are replaced by wireless modules located on each component. A typical implementation of the invention may be in semiconductor manufacturing equipment, which includes a plurality of sensors, valves, machining tools, etc. that all require remote control and would benefit from use of a wireless network. The systems and methods could also be used with a system having distributed components, such as for example, as system having components spread throughout a room, plant, or area that are controlled or accessed by a control system.

The following U.S. patents describe examples of various systems within which the present invention may be implemented: U.S. Pat. No. 6,232,790 (semiconductor test station), U.S. Pat. No. 6,626,734 (semiconductor wafer planarization station), U.S. Pat. No. 6,292,708 (wafer processing machine), and U.S. Pat. No. 6,225,233 (semiconductor manufacturing machine). For purposes of explanation, provided below is an example of the system and methods of the present invention incorporated with the semiconductor-manufacturing device disclosed in the U.S. Pat. No. 6,225,233.

Specifically, FIG. 1 is a diagrammatic view illustrating the construction of a semiconductor device manufacturing machine 10. The machine includes a processing chamber 12 in which processing is conducted on a semiconductor wafer 14 located on a stage 16 under low pressure. A load lock chamber 18 is provided for loading the semiconductor wafer 14 to the manufacturing machine from an external source. A feeding chamber 20 is affixed in an airtight manner between the processing chamber 12 and the load lock chamber 18 and having therein a feeding mechanism (manipulator) 22 for feeding the semiconductor wafer 14 to and removing it from a predetermined position within the processing chamber 12.

The feeding mechanism 22 has at its tip end a holder 24 for holding directly the semiconductor wafer 14 when the feeding mechanism 22 feeds the semiconductor wafer 14. Between the processing chamber 12 and the feeding chamber 20, there is provided a gate valve 26 for partitioning and sealing in an airtight manner the processing chamber 12 from the feeding chamber 20. Between the feeding chamber 20 and the load lock chamber 18, there is provided another gate valve 28 for partitioning and sealing in an airtight manner the feeding chamber 20 from the load lock chamber 18. Furthermore, the load lock chamber 18 has another gate valve 30 for partitioning and air-tightly closing between the load lock chamber 18 and a space external to the machine.

Figure 2:
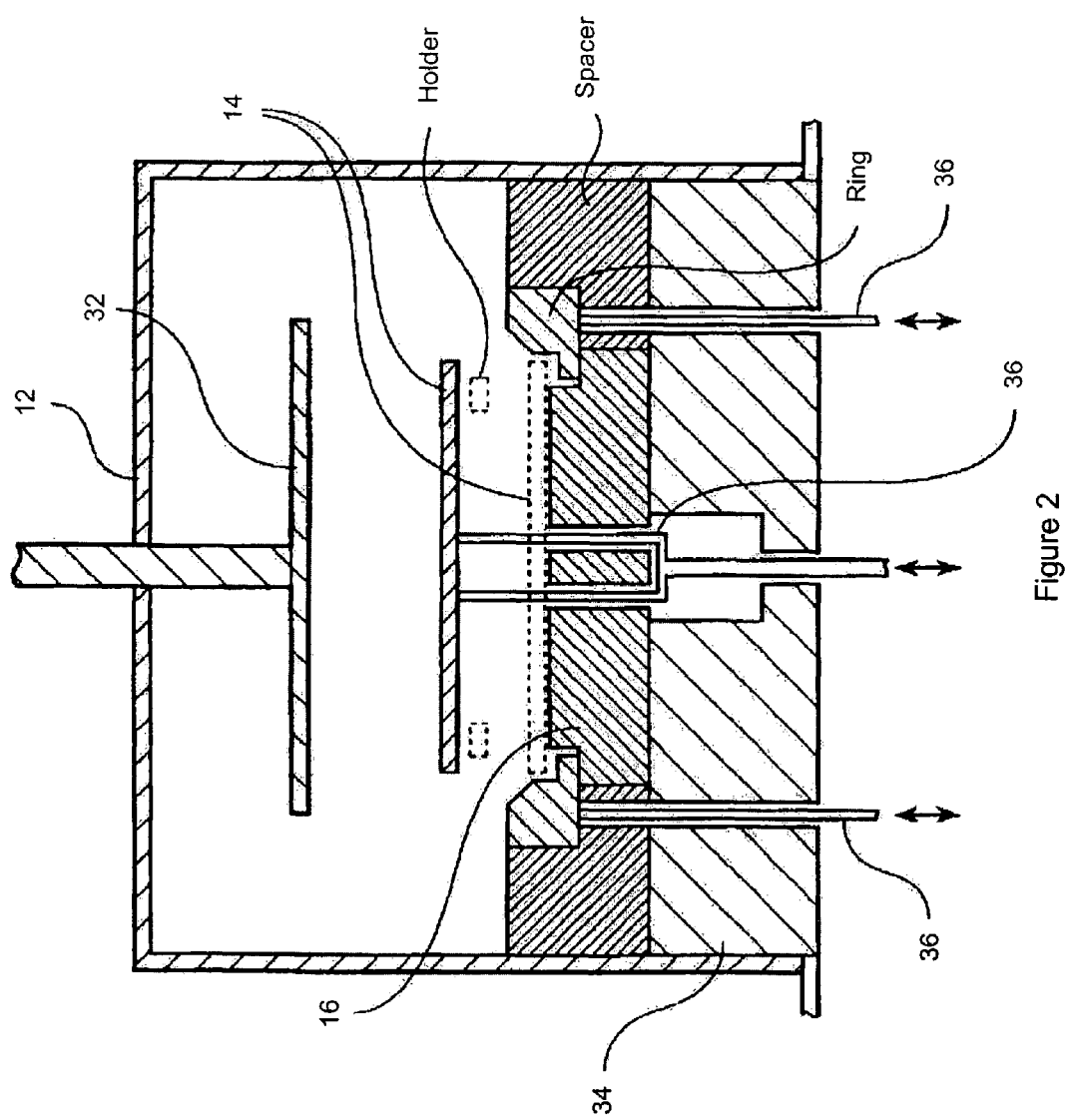
FIG. 2 is a diagrammatic sectional view of the processing chamber of the semiconductor device manufacturing machine of FIG. 1.

As shown in FIG. 2, the processing chamber 12 includes an upper electrode 32 and a lower electrode 34 for generating plasma therebetween, the stage 16 provided at the side of the lower electrode 34 supports the semiconductor wafer 14 when the semiconductor wafer is etched. A plurality of lift pins 36 are provided that can be vertically moved up and down in order to locate the semiconductor wafer on the stage and to maintain the semiconductor wafer at a predetermined height from an upper surface of the stage when the semiconductor wafer is to be removed from the stage.

As illustrated in FIGS. 1 and 2, a semiconductor manufacture device may include a wide variety of components for either performing operations or sensing information during the manufacturing process. For example, the equipment may include:

Gas and fluid delivery flow controllers;

Pressure gauges;

Actuators for wafer lift, wafer handling, vacuum valves, chamber valves, and the like;

Instrumentation and metrology located next to the process tool or process chamber;

RF generators and matching networks;

Vacuum pumps and vacuum analysis equipment;

Temperature controllers for the chamber, ambient conditions, or cooling water; and Other ancillary equipment required for the proper function of the semiconductor process tool.

In the present invention, either some or all of these different components could be connected via a wireless network as described herein.

Figure 3:
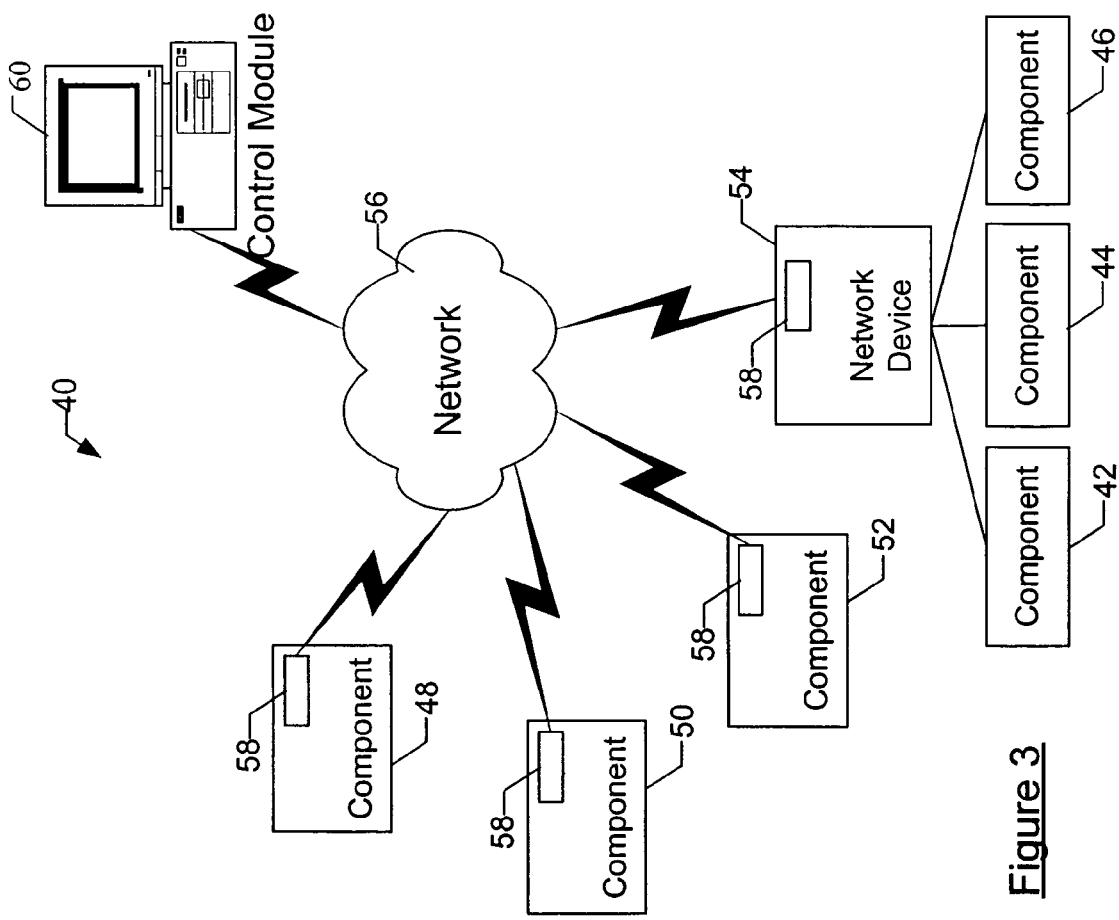
FIG. 3 is a generalized block diagram of a wireless network for connecting various components located on manufacturing equipment with a central control module according to one embodiment of the present invention.

FIG. 3 illustrates a distributed wireless system according to one embodiment of the present invention. As illustrated, the system 40 includes a plurality of components 42-52, such as sensors, actuators, or the like that are distributed about a piece of equipment, facility, area, etc. Some of the components, such as 48-52, include wireless modules 58 for direct connection to a wireless network. Other components, such as 42-46 are connected to the network an intermediary control module 54. This intermediary control module includes a wireless module 58 for connection to the network 56. Further, intermediary control module is connected to each of the components 42-46 for controlling the devices and receiving data therefrom.

As further illustrated, the system includes a central control module 60, such as a PC, also connected to the network. In the system, the central control module controls the operations of the various components 42-52. Specifically, the central control module may transmit commands to the various components instructing the components to either perform an action in the manufacturing process and/or to sense parameter of the process. The components react to these commands and perform the desired functions. Further, the components may provide information to the central control module as requested. In this manner, the various components of an equipment or process can be controlled remotely via wireless communication.

Figure 4:
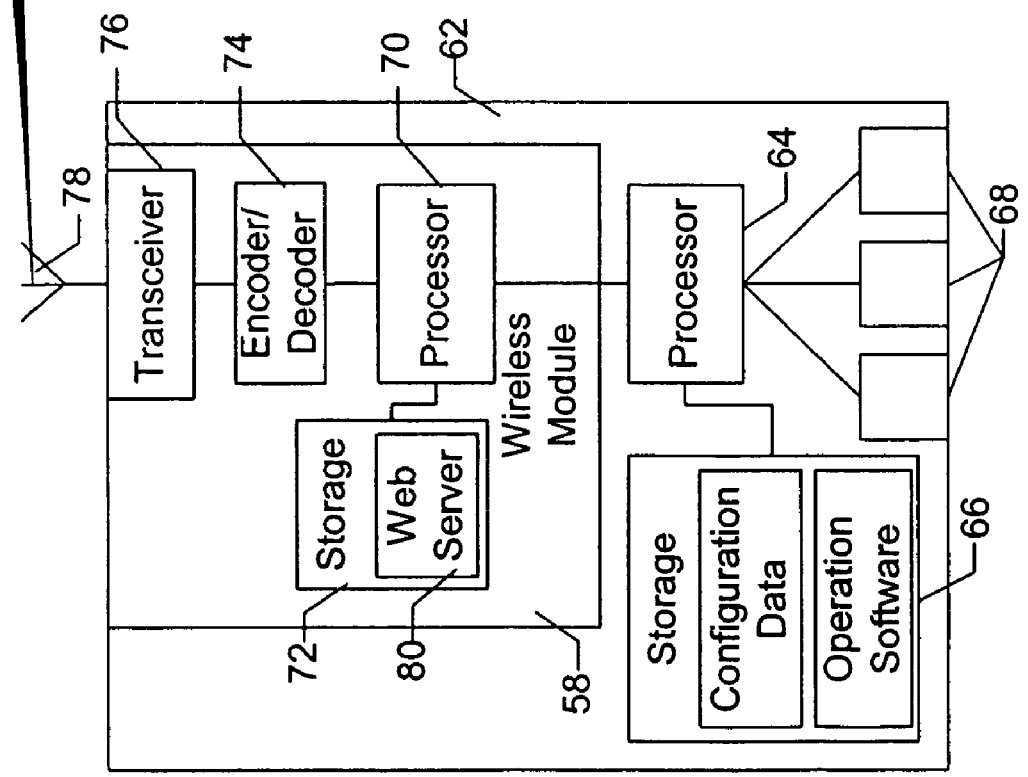
FIG. 4 is a generalized block diagram of a component on a manufacturing equipment including a wireless module according to one embodiment of the present invention.

With reference to FIG. 4, a component 62 containing a wireless module according to one embodiment of the present invention is illustrated. The component 62 initially includes various devices needed for operation of the component. For example, the component may include a processor 64 in the form of a microprocessor or ASIC for performing operations designated by the component device. The component may include a storage device 66, such as memory, for storing instruction code and data. Further, the component may include sensors, actuators, etc. 68 for performing operations, collecting data, etc.

Importantly, the component device 62 also includes a wireless module 58. The wireless module includes devices for creating a wireless communication path between the component and the remote central control module 60. Specifically, the wireless module may include a dedicated processor 70 in the form of a microprocessor or ASIC and a storage device 72. It is noted here that the embedded Ethernet device may instead use the processor 64 and storage device 66 of the component.

In addition, the wireless module also includes an encoder/decoder 74 and transceiver 76. In embodiments where the wireless module uses frequency communication, the wireless module also includes an antenna 78. Likewise, if the wireless module uses optical communication, an optical receiver and transmitter would be used. Other like devices would be used for other forms of wireless communication.

The encoder/decoder is used to encode data and commands prior to wireless transmission and to decode data and commands received by the transceiver. The encoder/decoder may use any wireless communication protocol for transmission of the data and commands. In one embodiment, IEEE802.11x wireless LAN protocol is used for frequency communications. Other embodiments may use other protocols, such as Bluetooth, ZigBee, WPAN (wireless personal area network), Wi-Fi, or UWB (ultra wide band) implementations to name a few. Further, if the wireless device is uses an infrared transceiver, the protocol used for wireless transmission may be IrDA.

Further, the wireless module may use any protocol for formatting the data and commands. In one particular embodiment, the wireless module uses an Ethernet protocol, such as TCP/IP. Ethernet protocols may be preferred, as they require little to no software modifications on the central control module. Specifically, the central control module can use a browser utility to access data from the wireless modules or transmit commands thereto. In this regard, the wireless module may include a web server 80 that places data collected by the component associated with the wireless module. In this embodiment, when the central control module requests data from the component, the web server 80 in the wireless module can transmit the contents of the webpage to the central control module.

Figure 5:
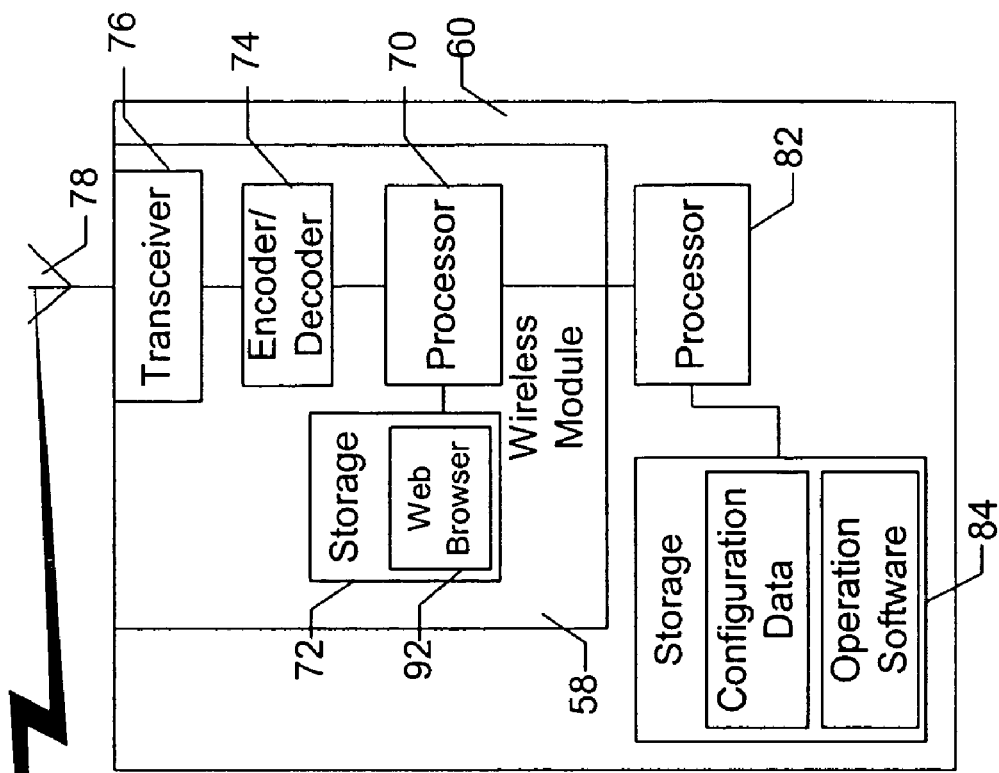
FIG. 5 is a generalized block diagram of a central control module including a wireless module according to one embodiment of the present invention.

FIG. 5 is an illustration of the various components of the central control module 60. As can be seen, the central module also includes a processor 82 and memory storage 84 for performing various operations associated with the control module. The central control module also includes an encoder/decoder 74 and transceiver 76 for communicating wirelessly with the various components 42-52. Here again, the central control module will include an antenna 78 where frequency communications are used and an optical sensor/transmitter if optical communications are used. Other like components would be provided for different forms of communication. Where Ethernet protocols are used for formatting data and commands, the central control module will include a web browser 92 for communicating with the components 42-52.

With regard to FIG. 3, in general operation, the central control module typically controls all communications on the network. Since the controller assumes the role of a master and the components as slaves, the controller can ensure that the bandwidth of the wireless network is not exceeded. It must be understood, however, that communications on the network may occur in any manner. For example, the central control module could grant control of the network to one of the components 42-52, such that the component could send data to other components or command other components to send data either to it or other components.

In some embodiments, the wireless modules for some of the components may act as both a client and a server in order to pass data from one component to the next and ultimately back to the central control module. This method provides a redundant path for the flow of data since the components can route the data in many ways. Also, the amount of power required for transmission can be reduced since each component need only communicate with its nearest neighbors and not directly with the central control module. The system could also include relay nodes in the network, which collect data traffic from various components and relay this data either to the central control module or to other components.

As mentioned above, most manufacturing equipment includes both sensors for recording and relaying information about the process and actuators for controlling the process. As a general rule, both communications relating sensor data and commands relating to control of actuators can be handled within the same bandwidth. However, there may be instances where the network may become overloaded to the point where proper control of the manufacturing process is inhibited. To remedy this, the systems and methods of the present invention may use separate data channels for handling different types of communication on the network. For example, IEEE802.11x networks operate on a number of channels, where each channel corresponds to a given frequency. The use of channels allows more than one network to operate in the same space without interference. Allocating the control function to one channel and the monitoring function to another channel could be used to make sure that the monitoring function does not impede the control function due to bandwidth limitations.

With reference to FIGS. 1 and 2, as an example of the operation of the present invention, the manufacturing machine 10 could include a plurality of wireless modules according to the present invention located on the various actuators and sensors of the machine. For example, wireless modules could be placed on the feeding mechanism (manipulator) 22, gate valves 26, 28, and 30, the controller for the upper 32 and lower 34 electrodes, the lift pins 36, etc. Further, the system could include wireless modules on the various sensors located throughout the machine. Finally, wireless modules are placed on the one or more control modules used to control the various actuators and sensors. The one or more control modules send commands across the wireless network to control the operation of the sensors and actuators. Further, the sensors and actuators may provide data concerning the manufacturing process to the central control module, so that the central control module can more accurately control the process. Importantly, by using the wireless modules and the wireless network, the systems and methods of the present invention reduce, if not eliminate, the problems with cabling.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for facilitating communication between various components distributed within manufacturing equipment, said system comprising:
   at least two components associated with the manufacturing equipment;
   at least one central control module for controlling and monitoring operation of the at least two components;
   wireless modules associated with each of said components and central control module capable of transmitting and receiving wireless signals,
   wherein said central control module communicates wirelessly on a first data channel across a wireless network with said components via said wireless modules thereby controlling operation of the components, and
   wherein said central control module communicates wirelessly on a second data channel across the wireless network with said components via said wireless modules thereby monitoring operation of the components.

2. A system according to claim 1, wherein said central control module controls communications on the wireless network with said components.

3. A system according to claim 1, wherein one of said components operates as a server.

4. A system according to claim 1, wherein said wireless modules use Ethernet protocol to format data for transmission.

5. A system according to claim 1, wherein said wireless modules use Transmission Control Protocol/Internet Protocol (TCP/IP) to format data for transmission.

6. A system according to claim 1, wherein said wireless modules transmit data using frequency signals.

7. A system according to claim 6, wherein said wireless modules use a protocol for transmitting signals wirelessly selected from the group consisting of IEEE802.11x wireless LAN, Bluetooth, ZigBee, WPAN (wireless personal area network), Wi-Fi, and UWB (ultra wide band).

8. A system according to claim 1, wherein the first data channel corresponds to a first frequency, and the second data channel corresponds to a second frequency different from the first frequency.

9. A system according to claim 1, wherein the components are selected from the group consisting of a flow controller, a pressure gauge, an actuator, a metrology device, an RF generator, a vacuum pump, and a temperature controller.

10. A system according to claim 9, wherein the components comprise at least one device selected from the group consisting of a processor, an application specific integrated circuit (ASIC), a storage device, a sensor and an actuator.

11. A system according to claim 1, wherein the wireless modules comprise:
    an encoder/decoder,
    a webserver, and
    a transceiver.

12. A system for facilitating communication between various components distributed within semiconductor manufacturing equipment, said system comprising:
    at least two components associated with the semiconductor manufacturing equipment;
    at least one central control module for controlling and monitoring operation of the at least two components;
    wireless modules associated with each of said components and central control module capable of transmitting and receiving wireless signals,
    wherein said central control module communicates wirelessly on a first data channel with said components via said wireless modules thereby controlling operation of the components, and
    wherein said central control module communicates wirelessly on a second data channel with said components via said wireless modules thereby monitoring operation of the components.

13. A system according to claim 12, wherein one of said components is a sensor and the other of said components is an actuator,
    wherein said central control module transmits commands wirelessly to said sensor and actuator, and said sensor transmits signals wirelessly to said central control module.

14. A system according to claim 12, wherein one of said components operates as a server.

15. A system according to claim 12, wherein said wireless modules use Ethernet protocol to format data for transmission.

16. A system according to claim 12, wherein said wireless modules transmit data using frequency signals.

17. A system according to claim 12, wherein the first data channel corresponds to a first frequency, and the second data channel corresponds to a second frequency different from the first frequency.

18. A system according to claim 12, wherein the components are selected from the group consisting of a flow controller, a pressure gauge, an actuator, a metrology device, an RF generator, a vacuum pump, and a temperature controller.

19. A system according to claim 18, wherein the components comprise at least one device selected from the group consisting of a processor, an application specific integrated circuit (ASIC), a storage device, a sensor and an actuator.

20. A system according to claim 12, wherein the wireless modules comprise:
    an encoder/decoders,
    a webserver, and
    a transceiver.

* * * * *